United States Patent [19]

Lam

[11] Patent Number: 5,745,183
[45] Date of Patent: Apr. 28, 1998

[54] IMAGE MOTION ESTIMATION SYSTEM WHICH DERIVES CANDIDATE BLOCK FROM INTERPOLATED MOTION VECTORS

[75] Inventor: Wai-Man Lam, Carmel, Ind.

[73] Assignee: Thomson Consumer Electronics, Inc., Indianapolis, Ind.

[21] Appl. No.: 519,438

[22] Filed: Aug. 25, 1995

[51] Int. Cl.$^6$ .................................................. H04N 7/32
[52] U.S. Cl. ................................................ 348/416; 348/699
[58] Field of Search .................................. 348/699, 416, 348/413, 402, 415, 409, 401, 400, 390, 384; 382/236, 232; H04N 7/137

[56] References Cited

U.S. PATENT DOCUMENTS

| | | | |
|---|---|---|---|
| 5,210,605 | 5/1993 | Zaccarin et al. | 348/699 |
| 5,398,068 | 3/1995 | Liu et al. | 348/699 |
| 5,418,617 | 5/1995 | Naimpally et al. | 348/413 |
| 5,424,779 | 6/1995 | Odaka et al. | 348/699 |
| 5,428,403 | 6/1995 | Andrew et al. | 348/699 |

OTHER PUBLICATIONS

*Information Technology — Generic Coding of Moving Pictures and Associated Audio Information:Video*, MPEG Image Encoding Standard, ISO/IEC 13818-2, 10th May 1994, Sections 7.6.1 and 7.6.3.6, Title Page & pp. 74–83.

*Primary Examiner*—Bryan S. Tung
*Attorney, Agent, or Firm*—Joseph S. Tripoli; Ronald H. Kurdyla; Alexander J. Burke

[57] ABSTRACT

A disclosed method and apparatus reduces the number of computations and simplifies the hardware required to provide compressed video output data. Video input data is converted into input pixel blocks. Best predicted blocks and associated motion vectors are determined for input pixel blocks located in a predetermined area of the image. In addition, candidate predicted blocks are determined for other input pixel blocks. This is done by .extrapolating motion vectors from the previously determined associated motion vectors and identifying candidate predicted blocks using the extrapolated motion vectors. The candidate predicted blocks are mutually compared, and one of the blocks is selected consistent with compression data rate requirements. The selected block is compressed to provide an output block which is formatted into an output data packet. A block match search is used to identify candidate Field predicted blocks and associated motion vectors from which other motion vectors are extrapolated and used to identify additional predicted blocks.

9 Claims, 6 Drawing Sheets

IMAGE MOTION ESTIMATION SYSTEM WHICH DERIVES CANDIDATE BLOCK FROM INTERPOLATED MOTION VECTORS

FIELD OF THE INVENTION

This invention is related to the field of digital image signal processing and more particularly to a method and apparatus for compressing video information selected from a plurality of motion dependent predictions.

BACKGROUND OF THE INVENTION

Video information transmission systems use video compression to reduce the amount of video data that is transmitted. This permits the use of less transmission bandwidth, transmission time and storage capacity. A commonly used technique for compressing video information, such as contained in a television signal, reduces redundant temporal picture information occurring in successive pictures of a picture sequence. Redundant temporal picture information is information associated with static picture segments or with picture segments that merely undergo a displacement between successive pictures. These picture segments are identified and coded so that the redundant temporal picture information is largely eliminated from the transmitted video data. The transmitted video data is appropriately coded to enable re-construction of a picture from other transmitted pictures and insertion of these coded picture segments at the receiver. This temporal information compression technique requires that estimates be made of the degree of motion that occurs for constituent blocks of a picture relative to other prior or subsequent pictures. These motion estimates, termed motion vectors, are used to code the video data so that a picture may be predicted from past or future pictures. This process is termed motion compensated prediction, and is well known.

One commonly used video compression standard using motion compensated prediction is the MPEG (Moving Pictures Expert Group) image encoding standard (ISO/IEC 13818-2, 10th May 1994). Video data encoded in this format consists of a cyclical sequence of successive pictures, or frames, of encoded data. Certain pictures (I pictures) are intra-coded, that is, encoded only from information within the picture itself. Other pictures (P pictures) are forward predictively coded, that is, encoded using motion compensated prediction from past I pictures or P pictures. The remaining pictures (B pictures) are both forward and backward predictively coded, that is, they are encoded using motion compensated prediction from past or future I pictures or P pictures. Therefore, P and B pictures are predictively encoded so that image reproduction from P or B pictures requires information derived from prior decoded I or P pictures. In contrast, I pictures are not predictively encoded and images may be reproduced from single I pictures, or frames.

Many motion vectors must be calculated in order to form the compressed, predictively encoded, MPEG P and B pictures. This represents a problem because motion vector calculation is a time consuming, computation intensive task. The result is that expensive, complex hardware is required to perform the motion vector calculations necessary to produce the transmitted compressed video data.

SUMMARY OF THE INVENTION

A disclosed video signal compression system in accordance with the principles of the present invention performs motion vector based predictions using a reduced number of motion vector computations. The disclosed video signal compression system calculates one or more motion vectors and extrapolates the remainder of the required motion vector values from these initial calculated values. Extrapolated motion vectors are computed by temporally scaling initial calculated motion vector values.

Image representative, MPEG compatible video input data is converted into input pixel blocks. Best predicted blocks and associated motion vectors are determined for input pixel blocks located in a predetermined area of the image. In addition, candidate predicted blocks are determined for other input pixel blocks. This is done by extrapolating motion vectors from the previously determined associated motion vectors and identifying candidate predicted blocks using the extrapolated motion vectors. The candidate predicted blocks are mutually compared and one of the blocks is selected consistent with compression data rate requirements. The selected block is compressed to provide an output block which is formatted into a data packet to provide the compressed video output data.

In accordance with a feature of the invention, candidate MPEG Field predicted blocks are determined by using a block match search to identify candidate Field predicted blocks and associated motion vectors. Other motion vectors are extrapolated from the associated motion vectors and used to identify other candidate Field predicted blocks.

In accordance with another feature, apparatus for providing compressed video output blocks at an output terminal using motion vector extrapolation is disclosed.

DETAILED DESCRIPTION OF THE DRAWINGS

The MPEG standard permits different methods for predictively encoding the P and B pictures. Each of these methods requires the calculation of motion vectors. The picture to be predictively encoded is divided into blocks (Current blocks), and the blocks are predicted on a block by block basis using the computed motion vectors. In the MPEG standard, the blocks are termed macroblocks and have a designated size of 16×16 picture elements (pixels). Several candidate predicted macroblocks may be formed for each macroblock currently being predicted by using, for example, frame based, field based and "dual prime" encoding. The best prediction for a particular Current Macroblock (CM) is selected from these candidate predicted macroblocks to be compressed and transmitted.

Section 7.6.3.3 and tables 7–9, 7–10 of the MPEG standard define 5 different motion vectors that may be calculated to form the candidate P picture macrobiotic predictions and 10 different motion vectors for the candidate B picture macroblock predictions (MPEG image encoding standard, ISO/IEC 13818-2, 10th May 1994). In B picture prediction the 5 P picture prediction motion vectors are not only applied in the forward prediction direction but also in the backward prediction direction. The principles of the invention, as will be described, are applicable to the 10 B picture motion vectors and, for simplicity, only P picture prediction is described.

Figure 1:
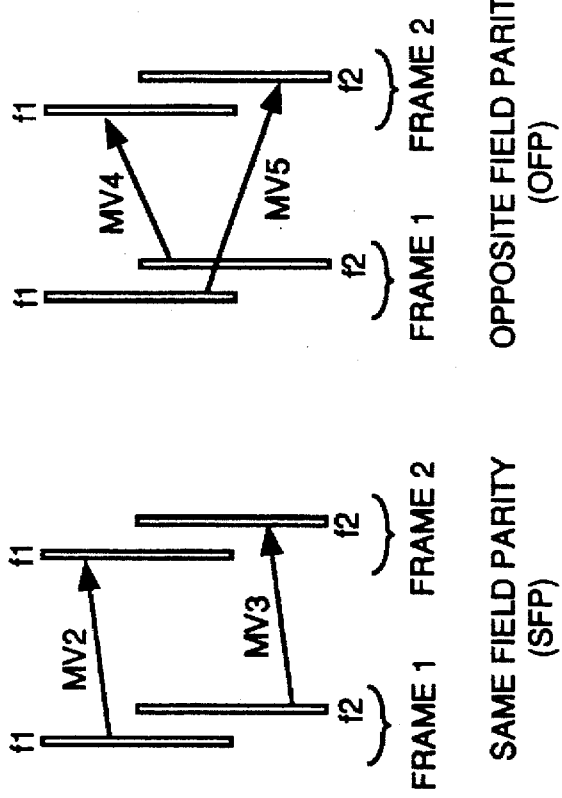
FIG. 1 illustrates the field relationships involved in the same field parity (SFP) and opposite field parity (OFP) motion vectors.

The 5 P picture motion vectors are identified below. The field relationships of the field motion vectors, MV2–MV5, are illustrated in FIG. 1. Motion vectors MV2 and MV3 have the Same Field Parity (SFP) as they are vectors between the same field of different picture frames, and each vector is termed a Same Field Parity Motion Vector (SFPMV). Motion vectors MV4 and MV5 have Opposite Field Parity (OFP) as they are vectors between different fields of different picture frames as illustrated in FIG. 1, and each vector is termed an Opposite Field Parity Motion Vector (OFPMV).

MV1 - Frame motion vector from picture currently being encoded to stored picture.

MV2 - Motion vector from field 1 (f1) of the picture currently being encoded to field 1 (f1) of the stored picture, (a SFPMV).

MV3 - Motion vector from field 2 (f2) of the picture currently being encoded to field 2 (f2) of the stored picture, (a SFPMV).

MV4 Motion vector from field 2 (f2) of the picture currently being encoded to field 1 (f1) of the stored picture, (an OFPMV).

MV5 - Motion vector from field 1 (f1) of the picture currently being encoded to field 2 (f2) of the stored picture, (an OFPMV).

Figure 5:
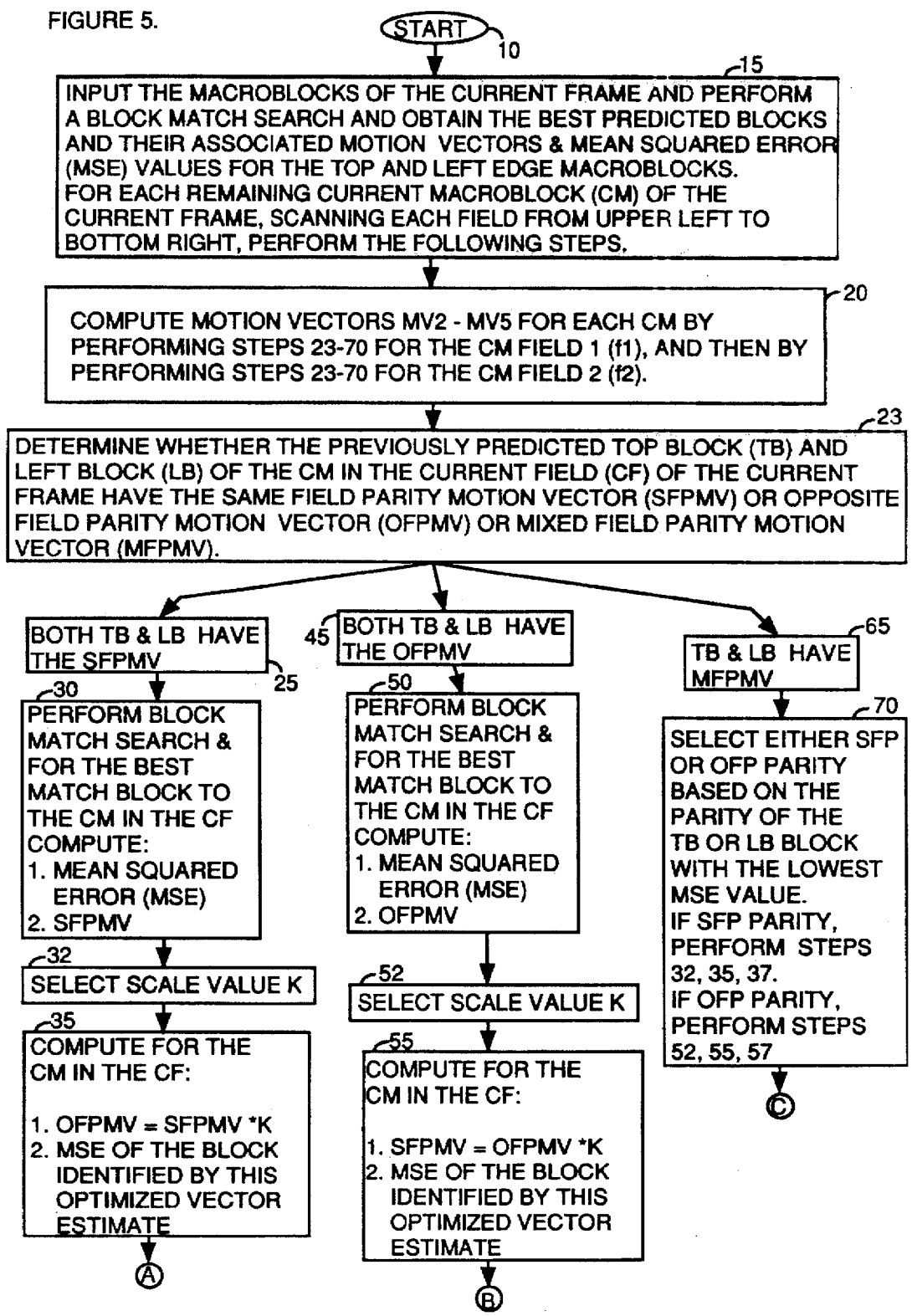
FIGS. 5-6 show a flowchart, according to the invention, detailing a method for determining the best predicted macroblocks for compression using a reduced number of motion vector calculations.
Figure 6:
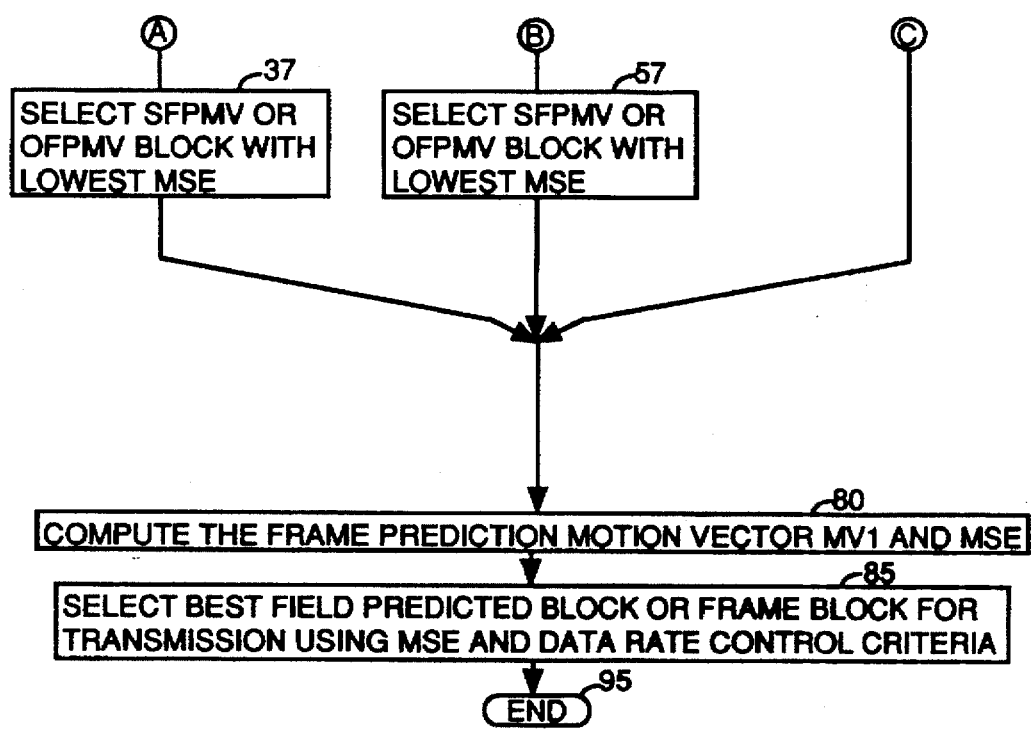

FIGS. 5–6 disclose a method according to the invention for producing a best predicted macroblock for each Current Macroblock of a frame. This is done by using a reduced number of computations to obtain the required motion vectors and consequently permits simpler, less costly hardware implementations to be used. The advantage yielded is of particular value in cost and size constrained video encoding applications, such as video cameras for example. Specifically, the method of FIGS. 5–6 involves reducing the number of computations in identifying the candidate predicted macroblocks and in obtaining their associated MV1–MV5 motion vectors and Mean Squared Error (MSE) values. A candidate predicted block MSE value is the calculated Mean Squared Error between the pixel values of the candidate predicted block and the corresponding pixel values of the Current Macroblock which it predicts. Although the method of FIGS. 5–6 is described in the context of an MPEG encoding system, the principles of the invention are also applicable to other video compression systems.

In overview, in step 15 of FIG. 5, following the start at step 10, the best predicted blocks and the associated motion vectors MV1–MV5 are determined for the top and left edge image macroblocks. Then, in steps 23–70 the two best field predicted blocks and the associated field motion vectors are determined for the remaining Current Macroblocks for field 1 and field 2 of the frame being encoded. This is done with a reduced number of computations using a method according to the invention. In step 80 the frame predicted macroblocks and the associated frame motion vector MV1 are also determined for the remaining image Current Macroblocks. This is done using a method according to the invention, involving a reduced number of computations. Finally, in step 85, the frame and field predicted macroblocks are mutually compared and the best predicted block for each of the remaining image macroblocks, based on MSE, is selected consistent with transmission system data rate limitations. The selected best predicted macroblocks, which may be either field or frame predicted macroblocks, are the macroblocks that are ultimately compressed and transmitted.

Figure 2:
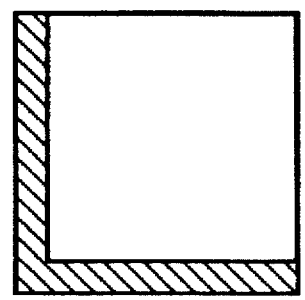
FIG. 2 illustrates the left and top edge macroblocks of a picture that is to be encoded for which all the necessary motion vectors are calculated.

Considering FIGS. 5–6 in detail, the Current Macroblocks of the frame being predicted are input in step 15 of FIG. 5, following the start at step 10. In step 15, the best predicted macroblock is determined for each Current Macroblock in a predetermined 'reference area' of the frame. In the preferred embodiment, the Current Macroblocks in the reference area consisting of the top and left edges of the frame, as illustrated in FIG. 2, are determined. Each best predicted macroblock is obtained by performing a full "block match search". Such a full "block match search" is a known method of identifying a search macroblock in a stored image that is the 'best match' to a Current Macroblock. The 'best match' search macroblock is chosen as the predicted macroblock for the corresponding Current Macroblock.

In performing the block match search, the Current Macroblock is compared with all the search macroblocks in a region of a predicted image. The macroblocks are compared by computing the MSE between each search macroblock and the Current Macroblock as an indication of the correlation between the two macroblocks. The 'best match block' with the lowest MSE value is selected as the predicted macroblock. As an alternative to the MSE, other comparison criteria such as the Mean Absolute Error (MAE) may also be used in a block match search or other type of selection process as a measure of correlation.

In step 15, motion vectors MV1–MV5 of the top and left edge Current Macroblocks are determined using the block match search process. The motion vectors MV1–MV5 for each Current Macroblock are given by the vector displacements between the Current and corresponding predicted macroblocks identified by the search process. The block match search process as described is known and may be implemented using commercially available motion estimation integrated circuits such as the SGS-Thomson STI3220 device, for example.

The best predicted macroblocks and the associated motion vectors for each of the remaining image Current Macroblocks are then determined. Step 15 provides that the Current Macroblocks are taken in order, progressing from upper left to bottom right of field 1 of the frame being predicted followed by field 2 of this frame. This ensures that the best prediction for the block above (TB) and the block to the left (LB) of the Current Macroblock have already been determined. The Current Macroblocks may alternatively be taken in any order that meets this requirement.

The determination of the field predicted macroblocks using a reduced number of computations according to the invention begins in step 20. Step 20 provides that a block match search is performed and motion vectors MV2–MV5 are calculated by executing the appropriate flowchart path lying between steps 23 and 70. Execution of step 23, followed by the appropriate flowchart path, is performed first for field 1 and then for field 2 of the Current Macroblock.

Figure 4:
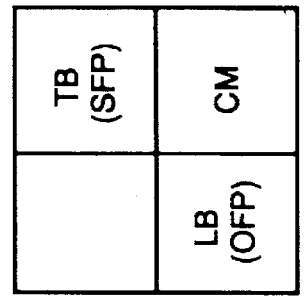
FIG. 4 illustrates the condition whereby the block above (TB) a Current Macroblock and a block to the left (LB) of a Current Macroblock in a picture to be encoded are of mixed field parity.
Figure 3:
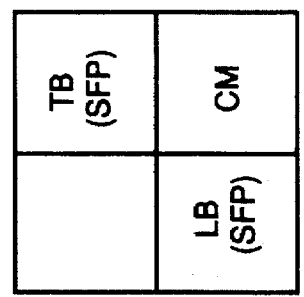
FIG. 3 illustrates a condition in which the block above (TB) a Current Macroblock (CM) and a block to the left (LB) of a Current Macroblock in a picture to be encoded are of the same field parity.

In step 23 of FIG. 5, the motion vector field parity of both the LB and TB best predicted macroblocks of the Current Macroblock, in the Current Field (CF), are examined. If, for example, the TB and the best predicted macroblock of TB are both in field 1 (f1) or field 2 (f2) of their respective pictures, TB is a Same Field Parity (SFP) macroblock with a Same Field Parity Motion Vector (SFPMV). Similarly, if LB and the best predicted macroblock of LB are in different fields of their respective pictures, LB is of Opposite Field Parity (OFP) with an Opposite Field Parity Motion Vector (OFPMV). FIG. 3 illustrates the condition in which both TB and LB are SFP, that is, both have the same field parity as the Current Macroblock. FIG. 4 illustrates the condition in which TB is an SFP macroblock and LB is an OFP macroblock, that is TB and LB are of Mixed Field Parity and have Mixed Field Parity Motion Vectors (MFPMV). Therefore, depending on the step 23 TB and LB parity determination, TB and LB will either both have a Same Field Parity Motion Vector (SFPMV), both have Opposite Field Parity Motion Vectors (OFPMV) or have Mixed Field Parity Motion Vectors (MFPMV). If TB and LB are of SFPMV type, steps 25, 30, 32, 35 and 37 are performed. Similarly, if TB and LB are of OFPMV type, steps 45, 50, 52, 55 and 57 are performed. If TB and LB are of MFPMV type, steps 65 and 70 are performed. In step 70, depending on the motion vector field parity of the TB and LB macroblock with the lowest MSE value, either the SFPMV (steps 25–37) or the OFPMV (steps 45–57) path processes are performed.

The flowchart of FIGS. 5–6 divides into 3 paths for steps 25–70, following step 23. The first path (steps 25–37) is executed if the TB and LB best predicted macroblocks are both SFPMV type. Then, the condition of step 25 is satisfied and flowchart execution continues with step 30. In step 30, a block match search, as previously described and known, is performed to identify a best match macroblock in a stored image for the Current Macroblock in the Current Field based on Mean Squared Error (MSE). This search is performed in the same relative field (f1 or f2) of the stored image as that of the Current Macroblock field in the frame being predicted. Then, the Same Field Parity Motion Vector (SFPMV) is computed from the vector displacement between the Current Macroblock and the best match macroblock in the stored image.

Figure 7:
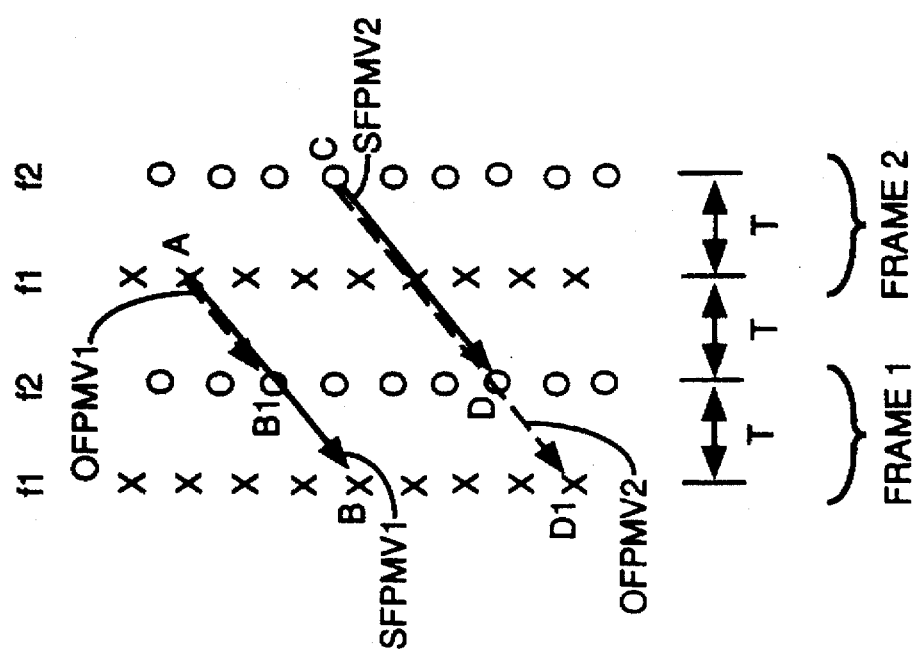
FIG. 7 illustrates motion vector scaling used in the flowchart of FIGS. 5-6.

Scale factor K is selected in step 32 to optimize the estimation of a motion vector performed in step 35. In step 32, a scale factor K is selected that linearly scales the calculated Same Field Parity Motion Vector (SFPMV) of step 30 to give an estimate of the Opposite Field Parity Motion Vector (OFPMV). The SFPMV is linearly scaled based on the difference in elapsed time between the Current and predicted macroblocks associated with the SFPMV and the elapsed time between the Current and predicted macroblocks associated with the estimated OFPMV. For example, FIG. 7 illustrates the determination of K values for the estimation of the OFPMV in two cases. In case 1, for a calculated SFPMV1 between macroblock center points A (frame 2, field 1) and B (frame 1, field 1), a K value of 0.5 is computed and OFPMV1 between macroblock center points A and B1 (frame 1, field 2) is estimated as 0.5 * SFPMV1. This is because, to a first order approximation, the time between A and B1 (T) is 0.5 of the time between A and B (2T). Similarly, in case 2, for SFPMV2 between macroblock center points C (frame 2, field 2) and D (frame 1, field 2), a K value of 1.5 is computed and OFPMV2 between macroblock center points C and D1 (frame 2, field 2) is estimated as 1.5 * SFPMV2. This is because, to a first order approximation, the time between C and D1 (3T) is 1.5 of the time between C and D (2T). T is the time period between successive fields in these examples. Similar temporal scaling motion vector estimation is applied in "Dual prime" type prediction (section 7.6.3.6 MPEG image encoding standard, ISO/IEC 13818-2, 10th May 1994).

Although in the preferred embodiment a first order linear scaling is employed, alternative scaling methods may be used. The previously discussed scaling method may be readily extended to cover motion vector estimation between non-successive images, or images that are variable time periods apart, for example. The scaling may also compensate for a vertical shift between the lines of fields of different parity as used by MPEG "Dual prime" type prediction. Although, the invention is described in the context of images composed of two interlaced fields, the principles of the invention and motion vector estimation process may be applied to image sequences composed of non-interlaced (Progressive-scan type) picture sequences. In such sequences each picture in the sequence may be regarded as a frame.

In step 35 (FIGS. 5–6), the K value determined in step 32 is multiplied by the SFPMV obtained in step 30 to give an estimated OFPMV as exemplified in cases 1 and 2 above. A field predicted macroblock is identified in the stored image using this initial estimated OFPMV. The initial estimated OFPMV is optimized further in step 35 by perturbing the (OFPMV) motion vector in a region around the identified macroblock center to find additional local predicted macroblocks. The best field predicted macroblock and the optimum estimated OFPMV may then be identified by computing the associated MSE values of these local predicted blocks. The local macroblock with the lowest MSE is selected as the optimum local macroblock and its associated OFPMV is selected as the optimum OFPMV value.

Figure 8:
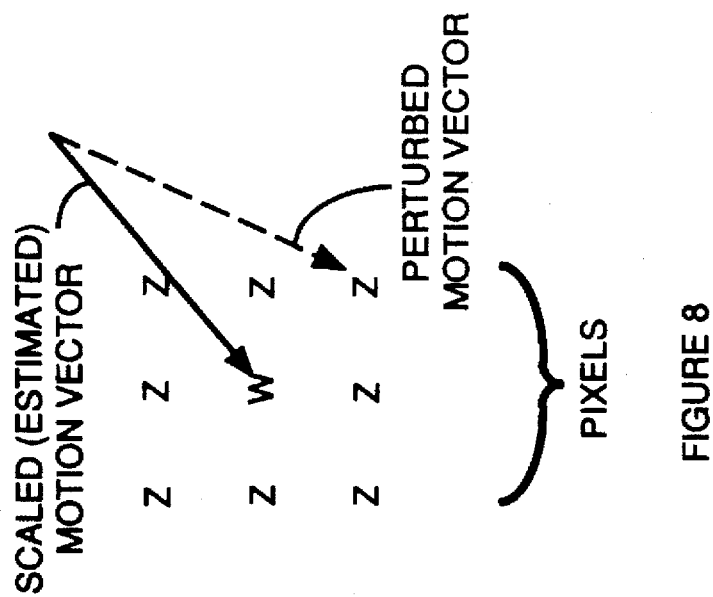
FIG. 8 illustrates a perturbation search process used to refine the estimated motion vector values in the flowchart of FIGS. 5-6.

FIG. 8 illustrates the perturbation of the initial estimated OFPMV around the center pixel (W) of the associated initial identified macroblock. The perturbed OFPMV search is performed for the eight macroblocks with the eight pixels labeled 'Z' as center points. The search region around W may be enlarged or reduced to fit the computation constraints of the system as appropriate. The decision to perform a perturbation search may be made dependent on an estimation quality criterion such as the magnitude of the OFPMV MSE value, for example. The size of the perturbation search region may be varied similarly depending on such a quality criterion. The best predicted macroblock for the Current Macroblock in the Current Field is selected as the SFPMV or OFPMV identified macroblock with the lowest MSE value in step 37 of the flowchart (FIG. 6).

The second path of the flowchart of FIGS. 5–6 following step 23, including steps 45–57 is executed if the TB and LB best predicted macroblocks are both of OFPMV type. If the condition of step 45 is satisfied steps 50–57 are executed. Steps 45–57 are equivalent to steps 25–37 except that in step 50 the OFPMV is computed. This is done by performing a block match search to identify a best match macroblock in the field of the stored image that is opposite to the field in which the Current Macroblock resides. Then, a scale factor K is determined in step 52 to optimize the estimation of the SFPMV from the OFPMV that is performed in step 55. Scale factor K is determined by the method described in step 32 as a linear scaling based on elapsed time difference between the OFPMV and SFPMV Current and predicted macroblocks. In step 55 an optimized field predicted macroblock in the stored image and an associated optimized SFPMV estimate and MSE value are determined using the perturbation search method explained in connection with step 35. In step 57, the best predicted macroblock for the Current Macroblock in the Current Field is selected as the SFPMV or OFPMV identified macroblock with the lowest MSE value.

The third path of the flowchart of FIGS. 5–6 following step 23, comprising steps 65 and 70, is executed if the TB and LB best predicted macroblocks are of MFPMV type. If the condition of step 65 is satisfied step 70 is executed. In step 70, the MSE values of the TB and LB best predicted macroblocks are compared. The Field Parity type (either SFPMV or OFPMV) of the TB or LB best predicted macroblock with the lowest MSE value is then determined. If the TB or LB macroblock with the lowest MSE value is an SFPMV type, the SFPMV path (steps 30–37) is executed. If the TB or LB macroblock with the lowest MSE value is an OFPMV type, the OFPMV path (steps 50–57) are executed. For example, if in comparing the MSE values of the TB and LB best predicted blocks, the LB predicted macroblock has the lower MSE value and is an OFPMV type, the OFPMV path is executed.

The field prediction process detailed in steps 23–70 is repeated for the next field of the frame currently being predicted. By this means a best predicted macroblock and associated motion vector are produced for each macroblock of both field 1 and field 2 of the frame being predicted.

In step 80 the frame predicted macroblock and the associated frame motion vector MV1 are determined for the remaining Current Macroblocks. This is done using a method detailed in the flowchart of FIG. 9, involving a reduced number of computations according to the invention.

Figure 9:
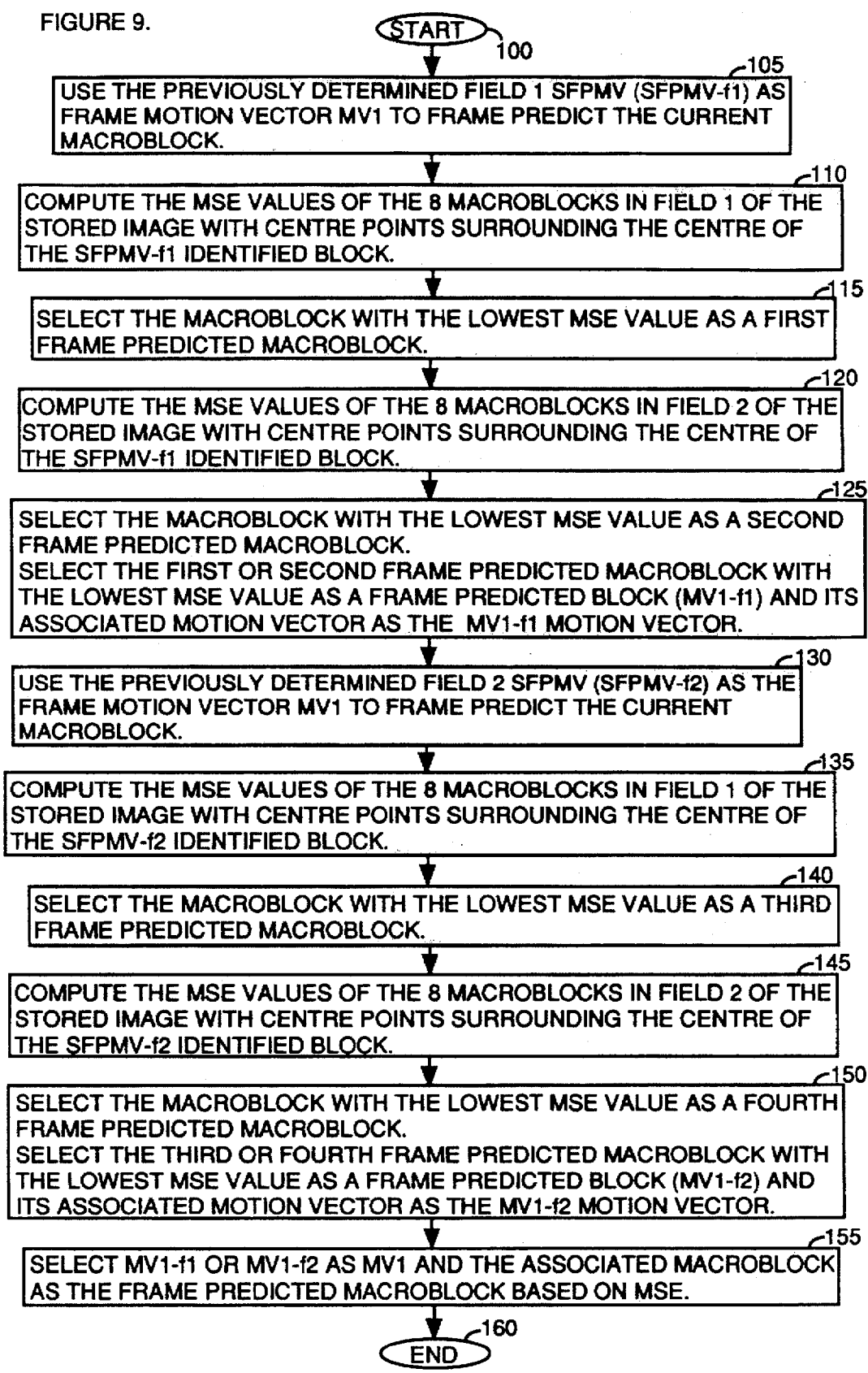
FIG. 9 shows a flowchart, according to the invention, for determining the best frame predicted macroblock and associated motion vector MV1.

In step 105 of FIG. 9, following the start at step 100, the SFPMV of field 1 of the frame currently being encoded (SFPMV-f1), determined in steps 37 or 57 (FIG. 6), is used for frame prediction. In step 105, this SFPMV-f1 motion vector is used as frame motion vector MV1 to identify frame predicted macroblocks in the stored image for the Current Macroblock being predicted. In step 110, a local search is performed in field 1 of the stored image around the frame predicted macroblock identified by vector SFPMV-f1. This is done in order to optimize the initial SFPMV-f1 prediction. The local search is performed in the same manner as previously described for the perturbation search of steps 35 and 55 (FIG. 5). That is, the MSE values of the eight macroblocks with central pixels that surround center pixel of the SFPMV-f1 identified macroblock are computed (step 110, FIG. 9). In step 115, the eight macroblock MSE values are compared and the macroblock with the lowest MSE value is selected as a First frame predicted macroblock. Similarly, in step 120, the MSE values of the eight macroblocks with central pixels that surround center pixel of the SFPMV-f1 identified macroblock in field 2 of the stored image are computed. In step 125, these eight macroblock MSE values are compared and the macroblock with the lowest MSE value is selected as a Second frame predicted macroblock. The First or Second frame predicted macroblock with the lowest MSE is selected as a frame predicted macroblock (MV1-f1) and its associated motion vector is selected as an MVI-f1 motion vector (step 125).

Steps 105–125 are essentially repeated in Steps 130–150 to determine a field 2 frame predicted macroblock (MVI-f2) and an associated motion vector (MVI-f2). In step 130, the previously determined (step 37 or 57 of FIG. 6) SFPMV-f2 motion vector is used as frame motion vector MV1 to identify frame predicted macroblocks in the stored image for the Current Macroblock being predicted. In step 135, a local search is performed in field 1 of the stored image around the frame predicted macroblock identified by vector SFPMV-f2. The MSE values of the eight macroblocks with central pixels that surround center pixel of the SFPMV-f2 identified macroblock are computed in step 135. These eight macroblock MSE values are compared and the macroblock with the lowest MSE value is selected as a Third frame predicted macroblock in step 140. The MSE values of the eight macroblocks with central pixels that surround center pixel of the SFPMV-f2 identified macroblock in field 2 of the stored image are also computed in step 145. These eight macroblock MSE values are compared and the macroblock with the lowest MSE value is selected as a Fourth frame predicted macroblock in step 150. In addition, the Third or Fourth frame predicted macroblock with the lowest MSE is selected as a frame predicted macroblock (MVI-f2) and its associated motion vector is selected as the MVI-f2 motion vector (step 150). Then, in step 155, either the MVI-f1 or MVI-f2 macroblock with the lowest combined field 1 and field 2 MSE value is selected as the best frame predicted macroblock. The associated MVI-f1 or MVI-f2 vector is the associated MV1 frame prediction motion vector. The FIG. 9 frame prediction flowchart is now completed and ends (step 160).

On completion of the FIG. 9 flowchart (step 80 of FIG. 6) execution resumes with step 85 of FIG. 6. In step 85, the best frame and best field predicted macroblocks for the Current macroblock are compared based on MSE. If the selection decision is not constrained by data rate control requirements, then either the best frame or best field predicted macroblock with the lowest combined field 1 and field 2 MSE value is selected for transmission. However, if data rate control requirements indicate that further data compression is necessary, the best predicted macroblock consistent with the permitted data rate limit is selected for transmission. For example, more highly compressed frame predicted macroblocks may be transmitted instead of field predicted macroblocks where higher compression is demanded. Upon selecting the macroblock for transmission in step 85 the determination of the best predicted macroblocks for compression is complete and ends (step 95).

Although FIGS. 5–6 discloses a method for selecting the best predicted macroblock from candidate field or frame predicted macroblocks, other types of prediction may be used to supply further candidate blocks. For example, "Dual prime" prediction may be used to supply additional candidate macroblocks either just before or after the step 80 (FIG. 6) frame prediction. Then in step 85 the best predicted block is selected from frame, field and Dual Prime predicted candidates rather than the field and frame candidates of the previous description. In addition, the invention is not limited to the step execution order depicted in FIGS. 5–6. Any order may be employed that produces a best predicted macroblock for each Current Macroblock.

Figure 10:
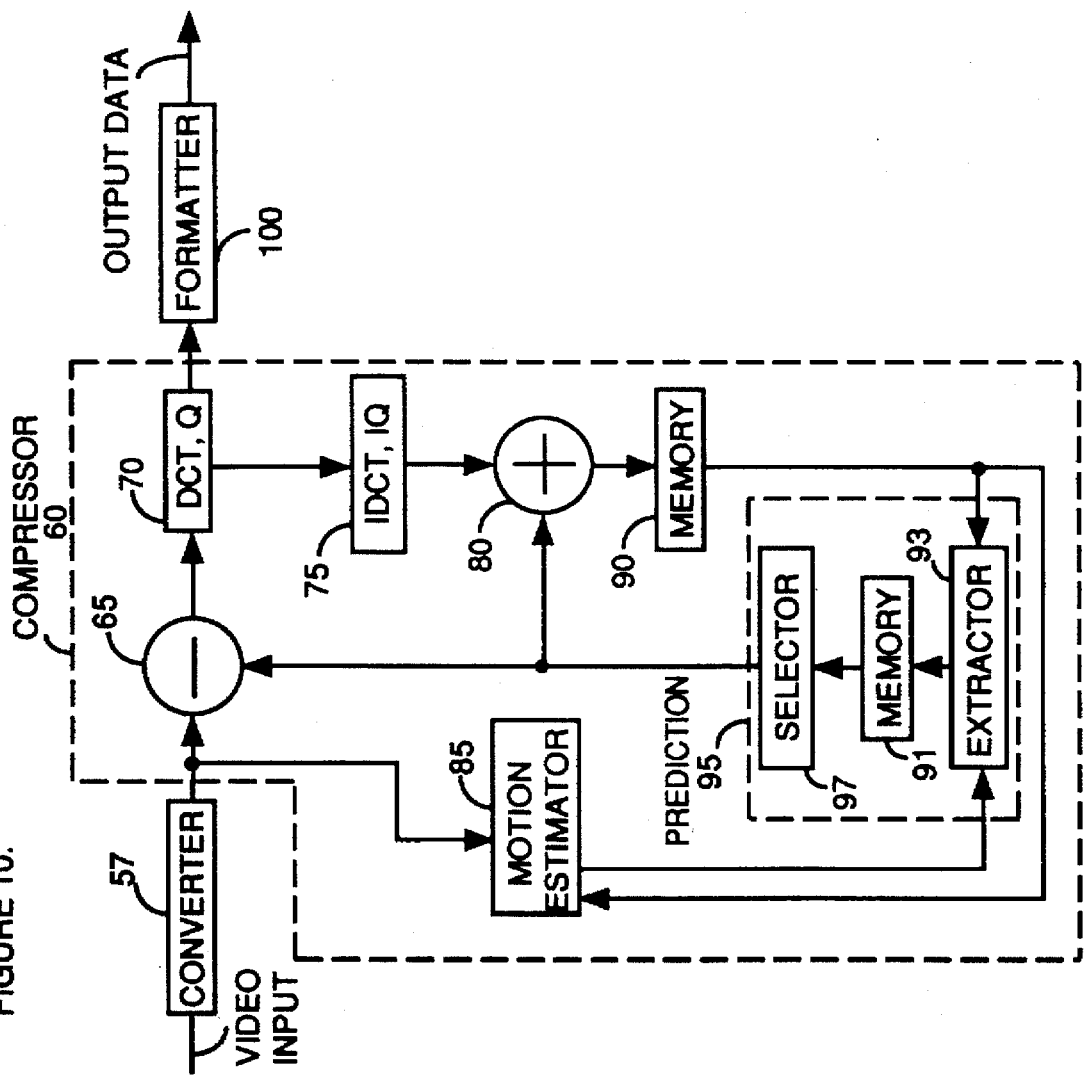
FIG. 10 shows MPEG compatible encoder apparatus in accordance with the principles of the present invention.

FIG. 10 shows MPEG compatible compressor apparatus suitable for using the principles of the present invention. The method of FIGS. 5–6 is implemented by motion estimator 85 in combination with prediction unit 95. Briefly, a digital video signal in the form of pixel luminance values is converted into Current Macroblocks to be encoded by converter 57 as known. The Current Macroblocks are input to data compressor 60. The system of FIG. 10 operates in a known environment in which the supply of Current Macroblocks is from unit 57 is controlled, e.g., by a controlled buffer in unit 57. This is done to enable the completion of a macroblock prediction cycle and the production of an output compressed block for each Current Macroblock. Compressor 60 performs field and frame macroblock predictions on each Current Macroblock and stores the resulting macroblock predictions in decompressed form in memory 91 of prediction unit 95. These predictions are the "candidate" predictions from which a best macroblock prediction for the Current Macroblock may be selected. Selector 97 in prediction unit 95 selects the best predicted macroblock for transmission from the field and frame candidate predictions stored in memory 91. The best predicted macroblock is then subtracted from the corresponding Current Macroblock it predicts by subtractor 65. The resulting residue from subtractor 65 is compressed by unit 70 to provide Output Data for further processing for transmission. This process is repeated for each Current Macroblock.

In describing the operation of the FIG. 10 encoder apparatus in more detail, the operation of compressor 60 is considered for I and P picture macroblocks only. The principles of operation of the FIG. 10 apparatus are readily adapted to B picture macroblock operation. Initially, assuming the I picture prediction is a frame based prediction, an I frame macroblock is passed unaltered to encoding unit 70 by subtractor 65. Unit 70 performs a Discrete Cosine Transform (DCT) on blocks of 8×8 pixels to generate DCT coefficients, as known. The coefficients are then quantized in unit 70. The combination of DCT and quantization in unit 70 results in many of the DCT frequency coefficients being zero. Unit 70 then run-length and statistically encodes the coefficients to produce long runs of zeros to minimize the output data produced. Consequently, unit 70 compresses the I frame macroblock by eliminating spatial redundancy in the input macroblock data. The process is repeated for each Current Macroblock. The resultant series of compressed I frame macroblocks is processed by formatter 100 which forms the compressed macroblocks from unit 70 into data packets including headers containing identification and other information.

The compressed I frame macroblock from unit 70 is also provided to decompressor 75 which performs the inverse of the DCT and quantization functions performed by unit 70. The output of unit 75 is a reproduction of the I frame macroblock input to compressor 60. The decompressed I frame macroblock is then passed unaltered by adder 80 and stored in memory 90 for predictive compression of subsequent P frame macroblocks. The above described I frame macroblock compression process is repeated until a full I frame of macroblocks is stored in memory 90.

For P frame prediction, the input P frame Current Macroblock being predicted is applied to a motion estimator 85. Unit 85 determines the field and frame motion vectors for the Current Macroblock using the method of FIGS. 5–6. For this purpose, the Field Parity of the TB and LB macroblocks i.e. whether they are SFPMV or OFPMV type, together with the TB and LB macroblock MSE values are stored in memory (not shown for clarity) within unit 85 of FIG. 10. The same information is also stored for the left and top edge macroblocks of the frame being encoded. Minimal additional memory is required since the MSE value and Field Parity may be stored comfortably in four (or less) eight bit bytes per macroblock. The required memory may be minimized by optimizing the order in which the Current Macroblocks are predicted.

The flowchart of FIGS. 5–6 up to step 80 is executed by unit 85 (FIG. 10) to provide motion vectors for two field predicted and one frame predicted macroblock for the Current Macroblock. In order to execute the flowchart of FIGS. 5–6, unit 85 uses the stored TB and LB information. In addition, unit 85 accesses the macroblocks of the stored frame in memory 90 to perform the required block match searches. Unit 85 determines the K values (steps 32 and 52 of FIG. 5) from the known temporal relationship between the Current Macroblock and the stored macroblocks in memory 90 of FIG. 10. The calculated K values are then used by unit 85 to perform the required motion estimation of steps 35 and 55 of FIG. 5 as previously described. The remaining flowchart steps are executed as previously described in connection with FIGS. 5–6 using these techniques to produce the motion vectors for two field predicted and one frame predicted macroblock.

The motion vectors of the two field predicted macroblocks and the frame predicted macroblock produced by unit 85 (FIG. 10) upon completion of execution of flowchart step 80 (FIGS. 5–6) are used by extractor 93 in prediction unit 95. Extractor 93 uses these motion vectors to extract the two field predicted macroblocks and the frame predicted macroblock from the frame stored in memory 90. These field and frame predicted macroblocks are the ones most nearly identical to the Current Macroblock and are stored by extractor 93 as candidate predicted macroblocks in memory 91. This embodiment may be readily extended to include other predictions such as "Dual Prime" predictions as previously described. In such case memory 91 would additionally contain "dual Prime" predicted candidate macroblocks.

Selector 97 (FIG. 10) executes step 85 of the flowchart of FIGS. 5–6 and selects one of the candidate predictions as the best macroblock prediction. Selector 97 selects the best field or frame predicted macroblock for compression based on MSE value, consistent with the permitted transmission data rate limit. Subtractor 65 subtracts, on a pixel by pixel basis, the best predicted macroblock output by selector 97 from the input Current P frame macroblock which is to be compressed. The differences or residues output from subtractor 65 are then compressed by unit 70 and processed similarly to the I frame macroblock data. The resultant compressed P frame macroblock is processed by formatter 100 which forms the series of compressed macroblocks from unit 70 into data packets including identification headers.

The compressed P frame macroblock residues from unit 70 are decompressed by unit 75, as with the I frame macroblocks, before being applied to adder 80. Concurrently, the best predicted macroblock which was subtracted by subtractor 65 from the macroblock being predicted is added back to the decompressed macroblock residues. This is done by selector 97 applying the best predicted macroblock values to a second input of adder 80, which adds the data on a pixel by pixel basis to restore the macroblock. This restored P frame macroblock forms part of the reconstructed picture and is stored in memory 90 for predictive compression of subsequent P frame macroblocks. The process is repeated for each Current Macroblock.

The apparatus of FIG. 10 may be implemented in other ways. For example, the method of FIGS. 5–6 for determining the best predicted macroblocks for compression may be implemented in a single decision control unit such as a microprocessor with an interface to compressor 60 rather than being distributed between function units 85 and 95 as shown in the preferred embodiment. Further, other known configurations of compressor 60 and ways of implementing the compressor 60 functions are known. For example, a prediction for a Current Macroblock may be achieved by using a multiple parallel prediction method as an alternative to a serial prediction method.

What is claimed is:

1. In a motion estimation system for processing video image data in the form of input pixel blocks, a method comprising the steps of:
    (a) determining a best predicted block and an associated first motion vector for a first input pixel block in a predetermined reference area of an image;
    (b) determining a plurality of candidate predicted blocks for a second input pixel block, said determining step including the steps of:
        (1) performing a block match search to determine a first candidate predicted block for said second input pixel block;
        (2) deriving an associated second motion vector for said first candidate predicted block;
        (3) selecting a type of motion vector to be extrapolated based on the motion vector type of said first motion vector; and
        (4) extrapolating a motion vector from said second motion vector, said extrapolated motion vector being of said selected motion vector type;
    (c) mutually comparing said candidate predicted blocks; and
    (d) selecting one of said candidate predicted blocks based on said mutual comparison and consistent with compression data rate requirements wherein
    said step of selecting a type of motion vector is based on the field parity of said first motion vector.

2. The method defined in claim 2 wherein
    said step of selecting a type of motion vector is based on whether said second motion vector is to be a field or frame based prediction motion vector.

3. The method defined in claim 2 wherein
    step (b5) further includes the step of identifying others of said plurality of candidate predicted blocks in a region around the center of said identified candidate predicted block.

4. The method defined in claim 3 wherein
    in step (b5) the identifying of said other candidate predicted blocks involves perturbing said extrapolated motion vector.

5. The method defined in claim 4 wherein
    step (b4) comprises temporally extrapolating said motion vector from said second motion vector.

6. In a motion estimation system for processing MPEG compatible video image data in the form of input pixel blocks, a method comprising the steps of:
    (a) determining a plurality of candidate predicted blocks for a first input pixel block, said determining step including the steps of:
        (1) performing a block match search to determine a first candidate MPEG field predicted block for said first input pixel block;
        (2) deriving an associated first motion vector for said first candidate field predicted block;
        (3) selecting a type of motion vector to be extrapolated based on the motion vector type of said first motion vector;
        (4) extrapolating a motion vector from said first motion vector, said extrapolated motion vector being of said selected motion vector type;
        (5) identifying an MPEG field predicted block as a second candidate predicted block using said extrapolated motion vector;
    (b) mutually comparing said candidate predicted blocks; and
    (c) selecting one of said candidate predicted blocks based on said mutual comparison wherein
    said step of selecting a type of motion vector is based on the field parity of said first motion vector.

7. The method defined in claim 6 wherein
    said step of selecting a type of motion vector is based on whether said second motion vector is to be a field or frame based prediction motion vector.

8. Motion estimation apparatus for processing video image data in the form of input pixel blocks, comprising:
    a motion estimator for providing motion vectors associated with candidate predicted blocks of said input pixel blocks wherein,
        (a) for an input pixel block located in a first area of an image said motion estimator uses block match searches to obtain motion vectors and
        (b) for an input pixel block located in a second area of said image said motion estimator uses a block match search to obtain a first motion vector and selects a type of motion vector to be extrapolated based on the motion vector type of said first motion vector and temporally extrapolates a second motion vector of said selected motion vector type from said first motion vector; and
    a prediction network for identifying a candidate predicted block by using said extrapolated motion vector wherein
    said motion estimator selects a type of motion vector based on the field parity of said first motion vector.

9. Apparatus according to claim 8 wherein
    said motion estimator selects a type of motion vector based on whether said second motion vector is to be a field or frame based prediction motion vector.

* * * * *

UNITED STATES PATENT AND TRADEMARK OFFICE
CERTIFICATE OF CORRECTION

PATENT NO. : 5,745,183
DATED : April 28, 1998
INVENTOR(S) : Wai-Man Lam

It is certified that error appears in the above-identified patent and that said Letters Patent is hereby corrected as shown below:

In claim 2, column 11, line 30, delete "2" and insert --1--.

Signed and Sealed this

Fifteenth Day of September, 1998

Attest:

BRUCE LEHMAN

*Attesting Officer*      *Commissioner of Patents and Trademarks*